United States Patent [19]

Nagumo

[11] Patent Number: 4,558,366
[45] Date of Patent: Dec. 10, 1985

[54] SMEAR REDUCTION IN SOLID STATE TELEVISION CAMERA

[75] Inventor: Fumio Nagumo, Atsugi, Japan

[73] Assignee: Sony Corporation, Tokyo, Japan

[21] Appl. No.: 666,126

[22] Filed: Oct. 29, 1984

Related U.S. Application Data

[63] Continuation of Ser. No. 399,193, Jul. 16, 1982, abandoned.

[30] Foreign Application Priority Data

Jul. 20, 1981 [JP] Japan .............................. 56-113137

[51] Int. Cl.$^4$ ............................................. H04N 5/30
[52] U.S. Cl. ..................................... 358/213; 358/41; 358/167; 358/209; 357/24
[58] Field of Search ............... 358/213, 211, 212, 209, 358/41, 167; 357/24 LR; 250/578; 307/311

[56] References Cited

U.S. PATENT DOCUMENTS 4,010,319 3/1977 Levine ................................ 358/213

FOREIGN PATENT DOCUMENTS

| 0012178 | 2/1981 | Japan | 358/213 |
| 56-12178 | 2/1981 | Japan | 358/213 |
| 0017276 | 1/1982 | Japan | 358/213 |
| 57-17276 | 1/1982 | Japan | 358/213 |

*Primary Examiner*—Thomas W. Brown
*Assistant Examiner*—Robert G. Lev
*Attorney, Agent, or Firm*—Hill, Van Santen, Steadman & Simpson

[57] ABSTRACT

A solid state television camera having a solid state image sensing device including a plurality of individual light sensing units arranged in both horizontal and vertical rows and for sequentially generating a signal corresponding to an image by transferring a charge generated by the light sensing units is disclosed, which includes a synchronizing signal generator for generating horizontal and vertical synchronizing signals, a clock pulse generator for generating a clock pulse corresponding to the horizontal synchronizing signal and controlling the sequential transfer of the charge representing one horizontal line of the image, the number of the clock pulses being equal to the sum of the number of the horizontal rows and a predetermined number, a detecting circuit for detecting the signal during the period of the predetermined number of the clock pulse, the period being after the signal corresponding to the image is obtained and a part of a vertical blanking period, a compensating signal generator supplied with the output of the detecting circuit and for generating a compensating signal, and a compensating circuit for removing the undesirable signal based on the charge mixed to the charge representing the image during the transfer of the latter charge by using the compensating signal.

6 Claims, 26 Drawing Figures

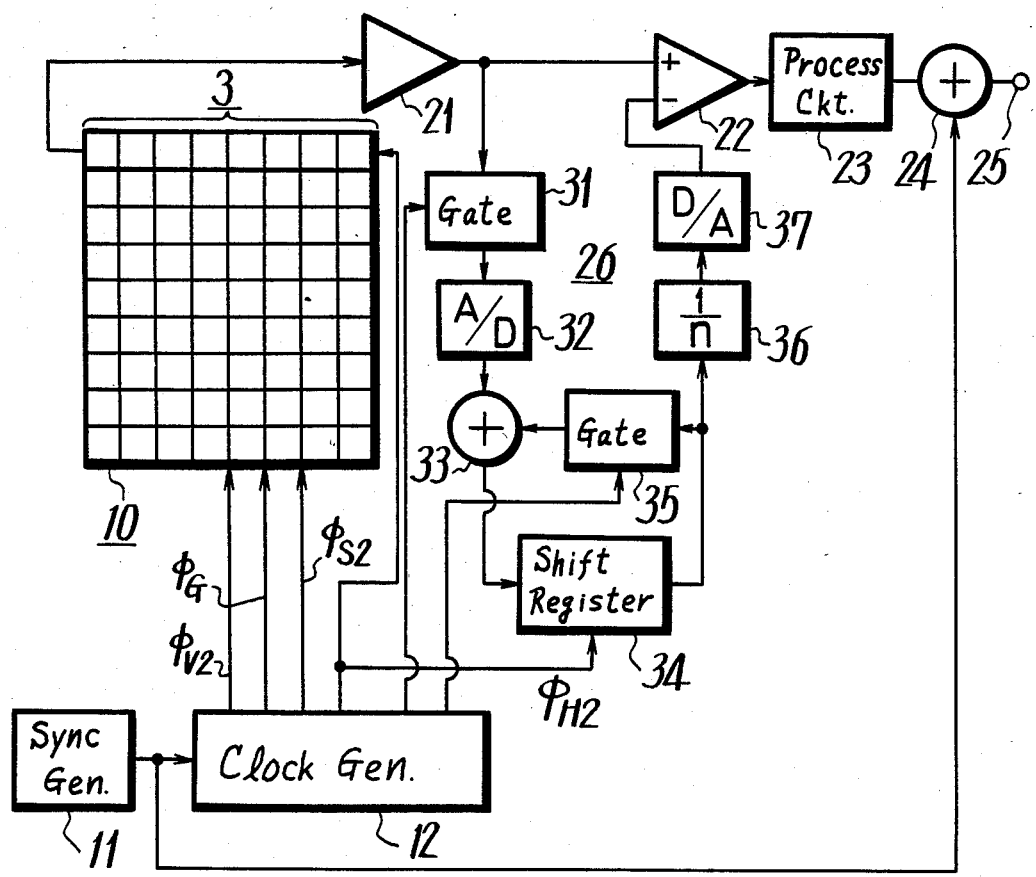
F I G. 5

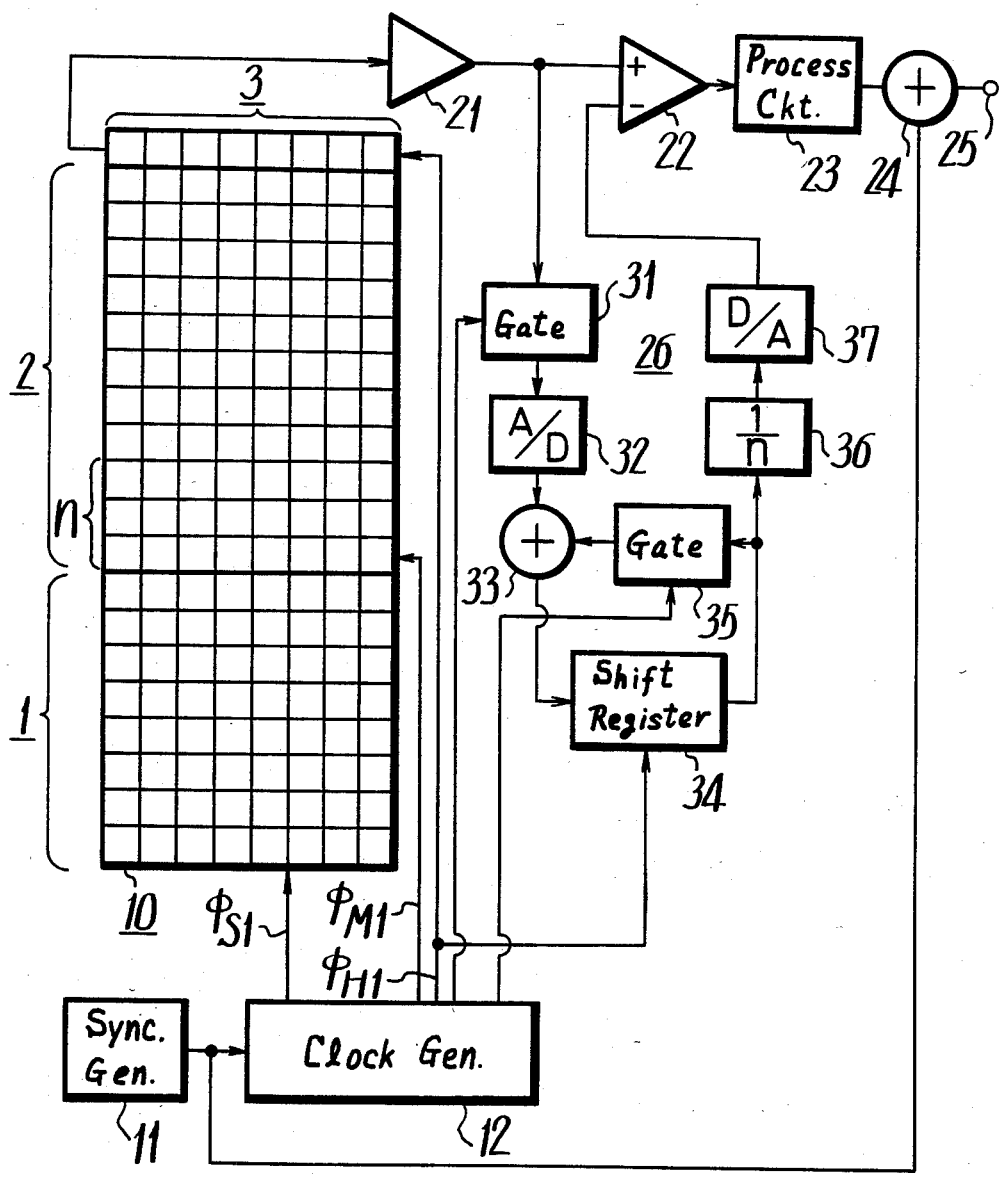
F I G. 7

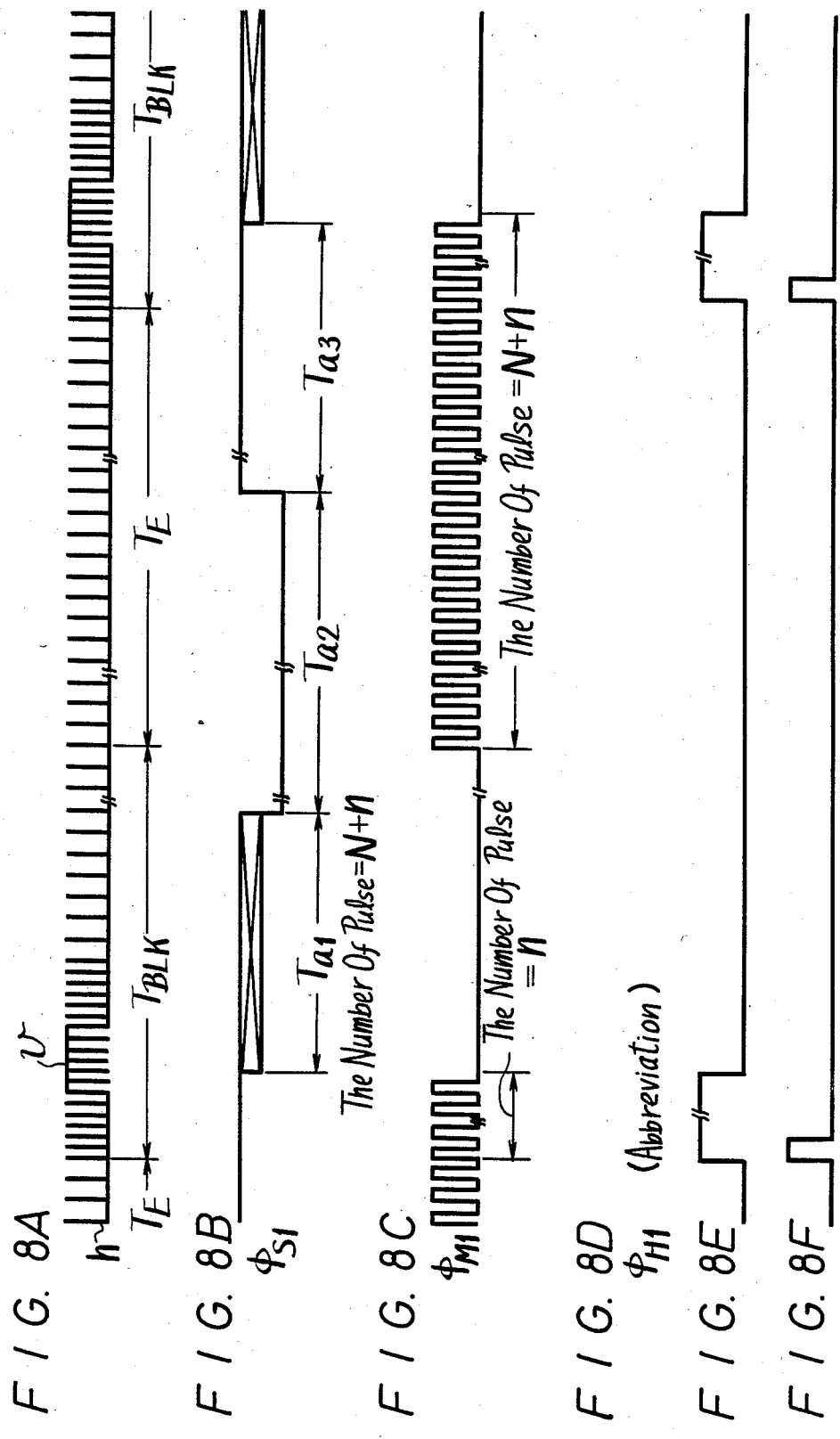

SMEAR REDUCTION IN SOLID STATE TELEVISION CAMERA

This is a continuation of application Ser. No. 399,193, filed July 16, 1982 now abandoned.

BACKGROUND OF THE INVENTION

1. Field of the Invention

The present invention relates to a television camera using a solid state image sensor such as a CCD (charge coupled device), and is directed more particularly to a smear reduction system for the solid state television camera.

2 Description of the Prior Art

Recently, solid state imaging devices have been developed in many laboratories in accordance with the advancement of semiconductor technology. Among various types of solid state image sensors, a charge coupled device (hereinafter, simply referred to as CCD) imager is of particular interest.

There are two types of the CCD imagers separated by the arrangement of the CCD. One is of a so-called frame-transfer type and another is of an interline-transfer type. The former type of the CCD imager has an image sensing array composed of a plurality of individual light sensing units arranged in both horizontal and vertical lines, temporary storage devices of the same number as that of the light sensing units for storing and transferring the charge accumulated in the light sensing units and a shift register for receiving the charge sequentially from the storage devices and generating a signal representing the image. In this type of the CCD imager, as the light sensing units are irradiated by the light of an image during the period of the transfer of the charge from the image sensing array to the temporary storage area, an undesirable charge is mixed to the transferred charge representing the image during this transfer period. That may cause an undesirable vertical bright line in a reproduced picture, which is a so-called "smear". The interline-transfer type CCD imager has a gate circuit between each light sensing unit and each charge transfer device, and this gate circuit is turned off during the transfer period, so that leakages of the charges due to the reasons described above in the frame-transfer type CCD imager can be prevented. However, in this type of the CCD imager, as the light sensing units, the gate circuits and the charge transfer devices are all formed in the same bulk, the light of the bright image with a long wave length enters into the deep layer of the bulk from the light sensing units and generates the charge in that area, and this charge spreads horizontally and leaks to the portion of the charge transfer devices. This causes a smear as described above.

The existing system for reducing the smear is available by masking several horizontal lines of the light sensing units, detecting the output signal corresponding to the masked lines and subtracting the detected output from the output of the image sensing device. This is, for example, shown in U.S. Pat. No. 4,010,319. But, the defect of the above system is that additional elements, namely the masks, are required, and hence the masking process is further required thus causing the manufacturing cost to be increased.

OBJECTS AND SUMMARY OF THE INVENTION

Accordingly, an object of the present invention is to provide a solid state television camera free from the defects of the prior art.

Another object of the invention is to provide a solid state television camera in which the smear is greatly reduced by a simple construction.

A further object of the invention is to provide a solid state television camera in which an undesirable charge leakage is detected during the vertical blanking period when no charge representing the image light is obtained.

According to one aspect of the present invention, there is provided a solid state television camera having a solid state image sensing device including a plurality of individual light sensing units arranged in both horizontal and vertical rows and for sequentially generating a signal corresponding to an image by transferring a charge generated by said light sensing units, said solid state television camera comprising:

(A) a synchronizing signal generator for generating horizontal and vertical synchronizing signals:

(B) a clock pulse generator for generating a clock pulse corresponding to said horizontal synchronizing signal and controlling the sequential transfer of the charge representing one horizontal line of the image, the number of said clock pulse being equal to the sum of the number of said horizontal rows and a predetermined number;

(C) detecting means for detecting the signal during the period of said predetermined number of the clock pulse, said period being after the signal corresponding to said image is obtained and a part of a vertical blanking period;

(D) a compensating signal generator supplied with the output of said detecting means and for generating a compensating signal;

(E) a compensating circuit for removing the undesirable signal based on the charge mixed to the charge representing the image during the transfer of the latter charge by using said compensating signal.

The other objects, features and advantages of the present invention will become apparent from the following description taken in conjunction with the accompanying drawings through which the like references designate the same elements and parts.

BRIEF DESCRIPTION OF THE DRAWINGS

FIG. 5 is a schematic block diagram showing an embodiment of the television camera according to the present invention, in which the present invention is applied to the interline-transfer type imager;

FIG. 7 is a schematic block diagram showing other embodiment of the present invention, in which the present invention is applied to the frame-transfer type imager; and FIGS. 8A through 8F are waveform diagrams each being used to explain the operation of the same.

DESCRIPTION OF THE PREFERRED EMBODIMENTS

In order that the present invention may be easily understood, the aforesaid two types of prior art imagers will be described. First of all, the so-called frame-transfer type imager is generally constructed as shown in FIG. 1.

Figure 1:
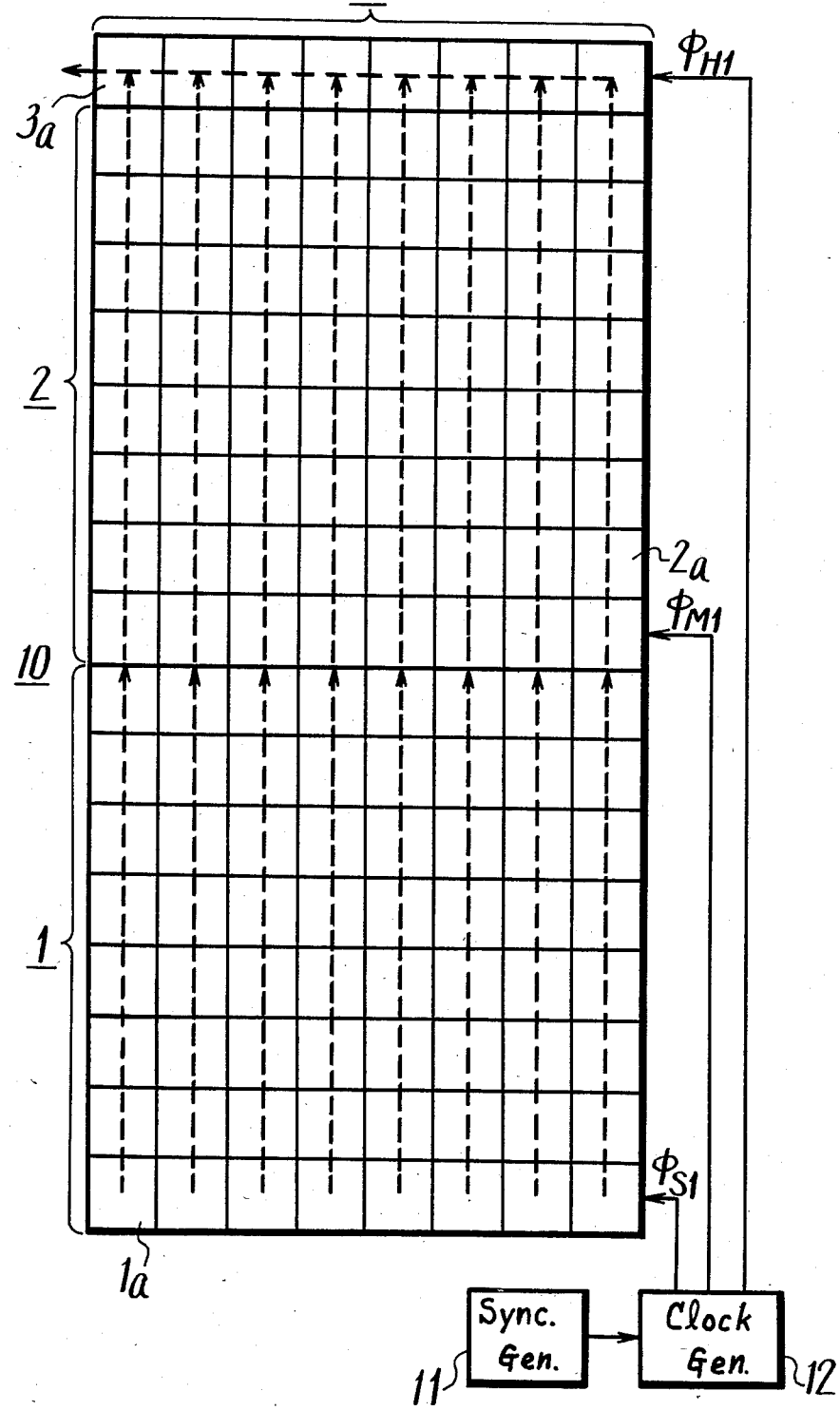
FIG. 1 is a schematic diagram used to explain a prior art frame-transfer type imager.

In FIG. 1, reference numeral 10 denotes generally a charge coupled device (hereinafter, simple referred to as CCD), in which reference numeral 1 denotes an image sensing array or light receiving area comprised of a plurality of light sensing units or light receiving elements 1a, each of which correspond to one picture element and are arranged in a matrix shape. In this case, each of the image sensing units 1a is sequentially coupled to one other in the vertical direction. Reference numeral 2 denotes a storage section or area, in which a plurality of storage elements or devices 2a to temporarily accumulate the signal charge obtained by the image sensing array 1 are arranged in a matrix pattern, and the respective storage devices 2a are vertically coupled to each other followed by the image sensing units 1a. Further, reference numeral 3 denotes a horizontal transfer register section or shift register, in which a plurality of register elements 3a are horizontally coupled to each other, and each register element 3a is coupled successively to each of the vertical lines formed by the sequential connections of the image sensing units 1a with the storage devices 2a. In addition, reference numeral 11 designates a synchronizing signal generator and reference numeral 12 designates a generator to generate a clock signal and the like. The clock signal and so on are supplied to the respective parts of the body of the CCD 10.

Figure 2:
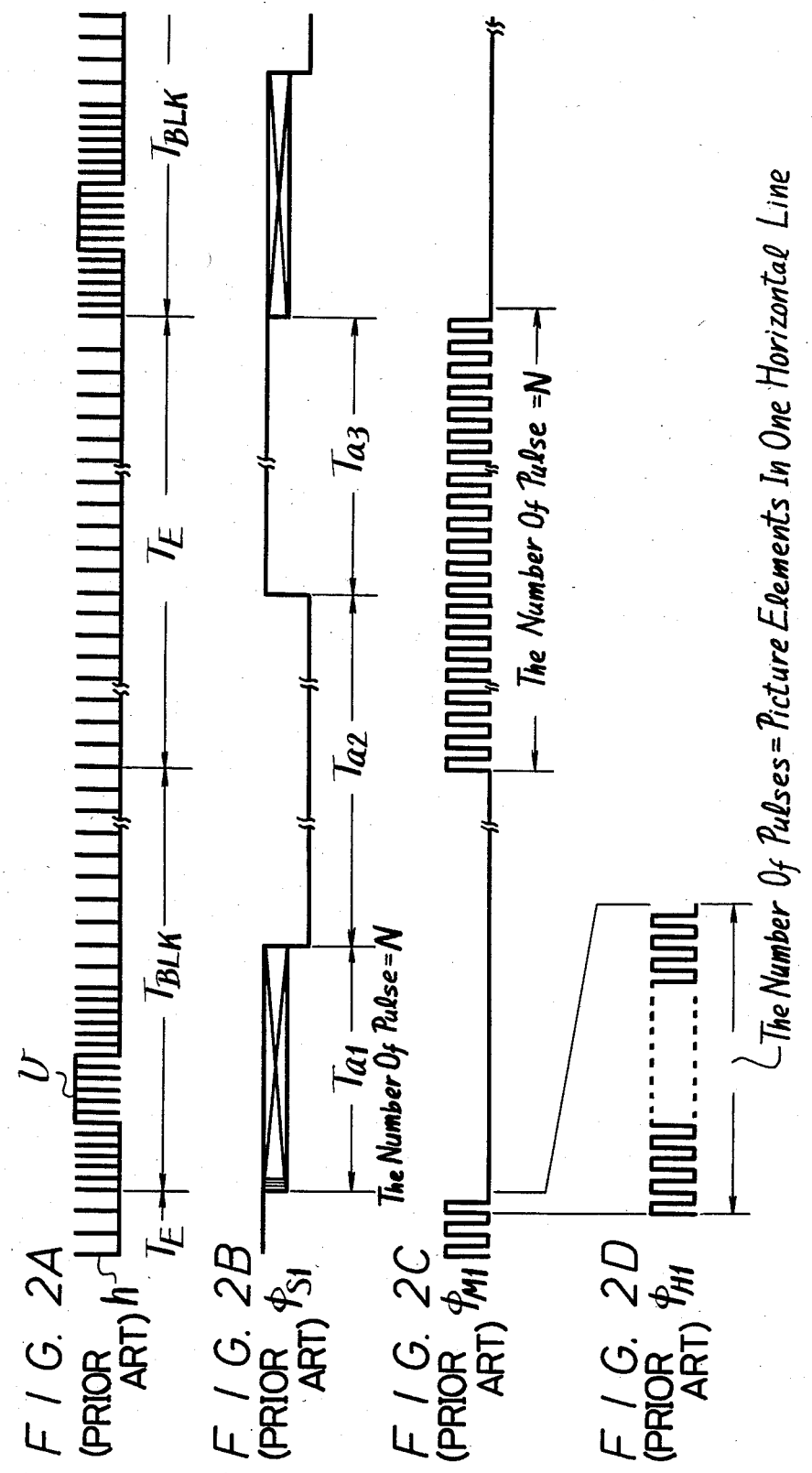
FIGS. 2A through 2D are waveform diagrams each being used to explain the operation of the imager shown in FIG. 1.

The frame-transfer type imager shown in FIG. 1 is operable as follows. Initially, the synchronizing signal generator 11 produces synchronizing signals as shown in FIG. 2A, where reference letter h indicates a horizontal synchronizing signal, v a vertical synchronizing signal, $T_{BLK}$ a vertical blanking period and $T_E$ indicates an effective picture period. When the generator 12 is supplied with the synchronizing signals of FIG. 2A, the generator 12 generates various clock signals, which are then supplied to the respective parts of the body of the CCD 10.

In other words, the image sensing array 1 is supplied with such a clock signal $\phi_{s1}$ as shown in FIG. 2B. During the period $T_{a2}$ at which the clock signal $\phi_{s1}$ is at low potential, the surface of each of the image sensing units 1a is put into the accumulation state so that on electron and a positive hole which are produced by the irradiation of the light of image are recombined and hence the charge is not accumulated beneath the CCD electrodes so that its inert state will be maintained. Whereas, during the period $T_{a3}$ in which the clock signal $\phi_{s1}$ is at high potential, the charge generated in association with the picked-up image light is accumulated beneath the CCD electrodes. Moreover, during the period $T_{a1}$ corresponding to the first half of the vertical blanking period $T_{BLK}$, pulses of N numbers which are equal to the number of the horizontal lines in the image sensing array 1 are generated from the generator 12 to transfer the charges vertically from the image sensing array 1 to the storage section 2.

Also, the storage section 2 is supplied from the generator 12 with a clock signal $\phi_{M1}$ composed of pulses of N numbers corresponding to that of the horizontal synchronizing signals h during the effective picture period $T_E$ as illustrated in FIG. 2C. This clock signal $\phi_{M1}$ transfers the signals accumulated in the storage section 2 sequentially at each horizontal line to the horizontal transfer register section 3.

The horizontal transfer register section 3 is supplied from the generator 12 with a clock signal $\phi_{H1}$ composed of pulses which are provided by dividing one horizontal period by the number of the picture elements in one horizontal line. In FIG. 2D, for the sake of explanation, the time base or axis is extended. By this clock signal $\phi_{H1}$, the signal stored in the horizontal transfer register section 3 is horizontally transferred to allow the picture elements to be read out one by one.

But, in this prior art imager of FIG. 1, the image sensing 1 is being continuously irradiated by the picked-up image light in the vertical transfer of the charge during the period $T_{a1}$. For this reason, when during the vertical transfer of the charge, the clock signal $\phi_{s1}$ becomes a high potential, an undesirable charge is accumulated so that such undesirable charge is mixed into the signal to be transferred thus resulting in the deterioration of the picture quality. Thus, if there is a remarkably bright portion on a part of a picture, by way of example, undesirable bright lines are caused in the upper and lower vertical lines thereof.

Figure 3:
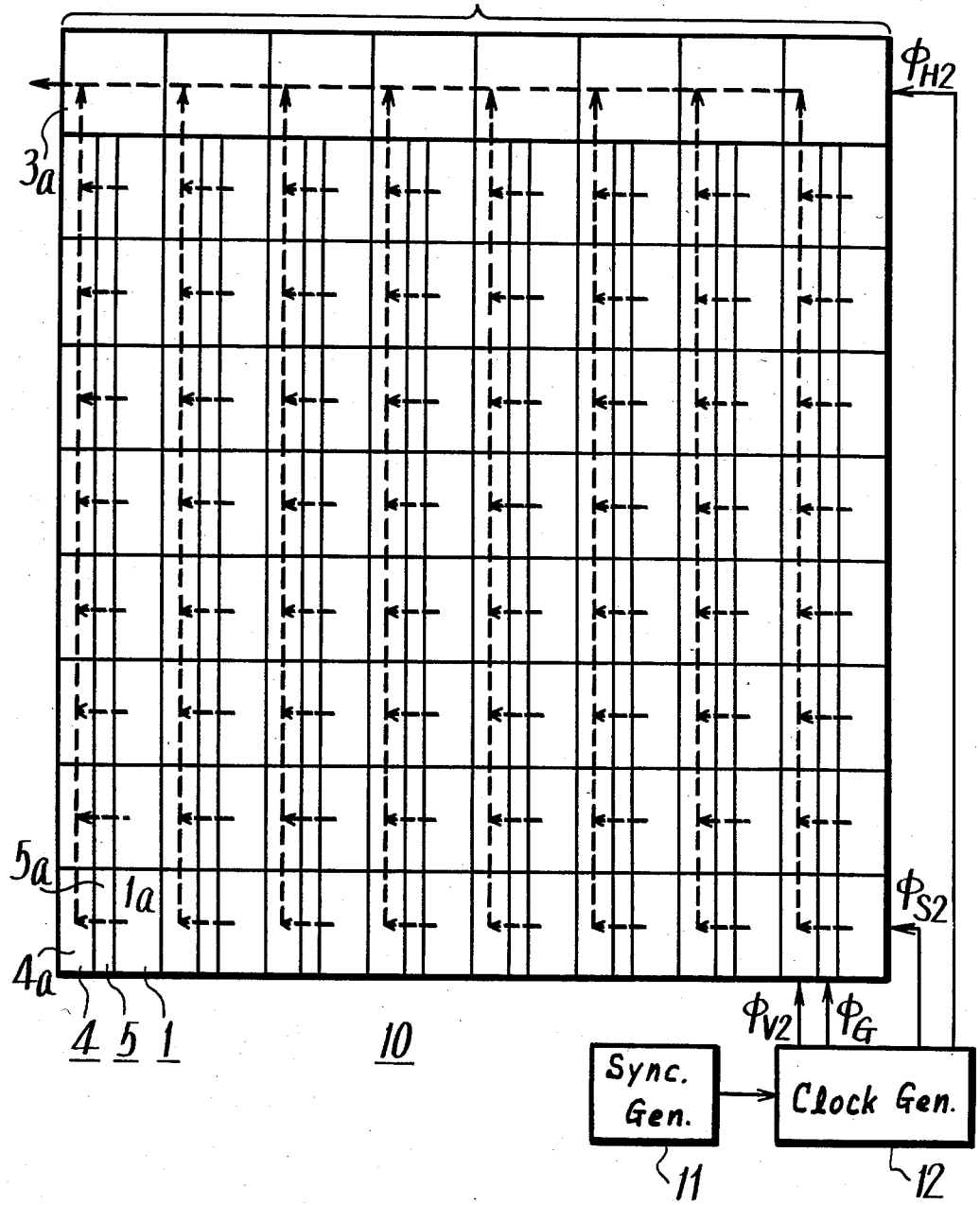
FIG. 3 is a schematic diagram used to explain a prior art interline-transfer type imager.

Whereas, the so-called interline-transfer type imager is generally constructed as follows. FIG. 3 schematically shows an overall arrangement thereof, in which like references designate the same elements and parts as those of FIG. 1. In FIG. 3, the image sensing array 1 is divided by the vertical lines of the image sensing units 1a. Reference numeral 4 designates the vertical transfer register or shift register section, in which register elements 4a are vertically coupled to one other, and coupled to the image sensing units 1a by way of gate portions 5, respectively. In this case, the image sensing units 1a are not coupled vertically to each other. These vertical transfer register sections 4 are respectively coupled to the respective register elements 3a of the horizontal transfer register section 3.

Figure 4:
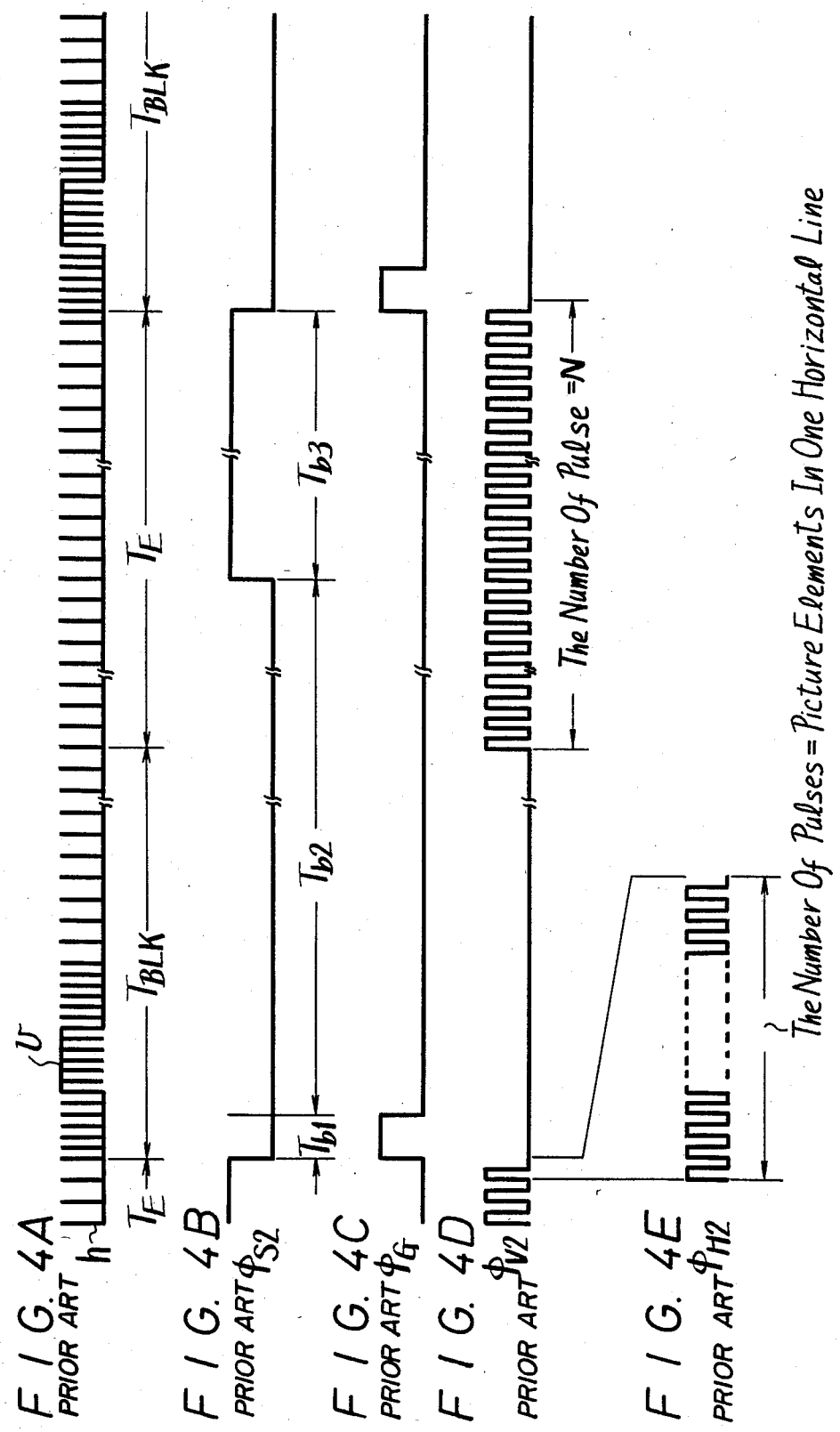
FIGS. 4A through 4E are waveform diagrams each being used to explain the operation of the imager shown in FIG. 3.

The interline-transfer type imager thus composed is operable as follows. First, FIG. 4A shows the similar sychronizing signals to those of FIG. 2A from the generator 11. Based upon the synchronizing signals, the image sensing array 1 is supplied from the generator 12 with such a clock signal $\phi_{s2}$ as shown in FIG. 4B. During the period $T_{b3}$ in which the above clock signal $\phi_{s2}$ is at high potential, the charge is accumulated in the image sensing array in response to the picked-up image light.

Also, the gate portion 5 is supplied from the generator 12 with such a gate pulse $\phi_G$ as shown in FIG. 4C. During the period $T_{b1}$ corresponding to the first half of the vertical blanking period $T_{BLK}$, the gate portion 5 is turned ON, so that the charge accumulated in the image sensing array 1 is transferred to the vertical transfer register section 4.

The vertical transfer register section 4 is supplied from the generator 12 with a clock signal $\phi_{v2}$ composed of pulses of N numbers corresponding to that of the horizontal synchronizing signals h of the effective picture period $T_E$ as shown in FIG. 4D. By this clock signal $\phi_{v2}$, the signal transferred to the vertical transfer register section 4 is vertically transferred by each one horizontal line sequentially to the horizontal transfer register section 3.

Further, the horizontal transfer register section 3 is supplied from the generator 12 with a clock signal $\phi_{H2}$ equivalent to that $\phi_{H1}$ of FIG. 2D as shown in FIG. 4E. By this clock signal $\phi_{H2}$, the signals transferred to the horizontal transfer register section 3 are horizontally transferred and then read out by each picture element.

In accordance with the interline-transfer type imager as mentioned above, the image sensing array 1 is isolated from the vertical transfer register section 4 by the gate portion 5 so that the charges accumulated in the image sensing array 1 will not be mixed with the signal during the vertical transfer of the charge.

In this imager, since the image sensing array 1, the gate portion 5 and the vertical transfer register section 4 are all formed on a single bulk and when the image light, the light of long wavelength is irradiated thereon, the light of longer wavelength enters from the surface of the image sensing array 1 into its deeper layer so as to produce the charge therein. This charge is spread horizontally and then leaked to the vertical transfer register section 4. Such leakage causes an undesirable bright line in the direction of the vertical line.

This reduces the signal-to-noise ratio and hence the picture quality is substantially deteriorated particularly during the period $T_{a3}$ or in the case where $T_{b3}$ is shortened to shorten the time to receive and accumulate the light of an image or if the so-called shutter speed is selected to be faster.

Therefore, it has been previously proposed in the art that the horizontal lines at any given integers in the part of the image sensing array 1 are masked and the signal derived from the masked image sensing array 1 can be considered as being the signal provided by the undesirable signal mixed to the signal during the transfer independent on the picked-up image light, so that such signal is memorized, and the signal corresponding to the memorized signal is subtracted from the output signal thus the undesirable bright line being eliminated.

But in the above types of imager, the provision of the mask portion on the image sensing array 1 requires many more elements and the extra process of masking the part of the image sensing array 1 is also required, thereby increasing the manufacturing cost thereof which is undesirable.

In view of the above points, the present invention is to provide a solid state television camera which is capable of the detection of the undersirable signal and the better elimination of the undesirable bright line without providing the masked portion.

By the way, in the generation of the undesirable bright line or smear as set forth above, such bright line or smear is caused on both the upper and lower sides of, for example, a particularly brighter part of the picture screen. To be more concrete, when the vertical transfer of the charge is performed upwardly as in FIGS. 1 and 3, the bright line is caused not only on the lower side part, through which the bright line is passed, transferred and produced to the outside, but also on the part of the upper side thereof. The reason for this is that in the part of the upper side, before receiving and accumulating the picked-up image light, the undesirable signal is transferred upon the preceding vertical transfer and then mixed with the signal, on which the accumulation is performed by the picked-up image light.

The inventor of the present invention considers such point as being significant.

That is, the present invention is to provide a solid state television camera, which includes the image sensing array composed of charge transferring elements, from which the signal representing an image is sequentially transferred and taken out and, the number of pulses for transfer is increased by a desired number to be much more than the number of the scanning lines of the image sensing array and, a signal during the period of pulses of the desired number after the completion of the signal representing the image is detected, and this detected signal is employed to eliminate the charge which will be mixed with the signal in the transfer of the charge during the next transfer period.

With reference to the drawings, embodiments of the present invention will now be described hereinafter, in which like references corresponding to those of FIGS. 1 to FIGS. 4E identify the same elements and parts, and hence they will not be explained in detail.

FIG. 5 is a schematic block diagram of an embodiment of the present invention, in which the present invention is applied to an interline-transfer type imager. In the figure, the body of the CCD 10 is the same as that of FIG. 3. This imager is operated as follows.

Figure 6:
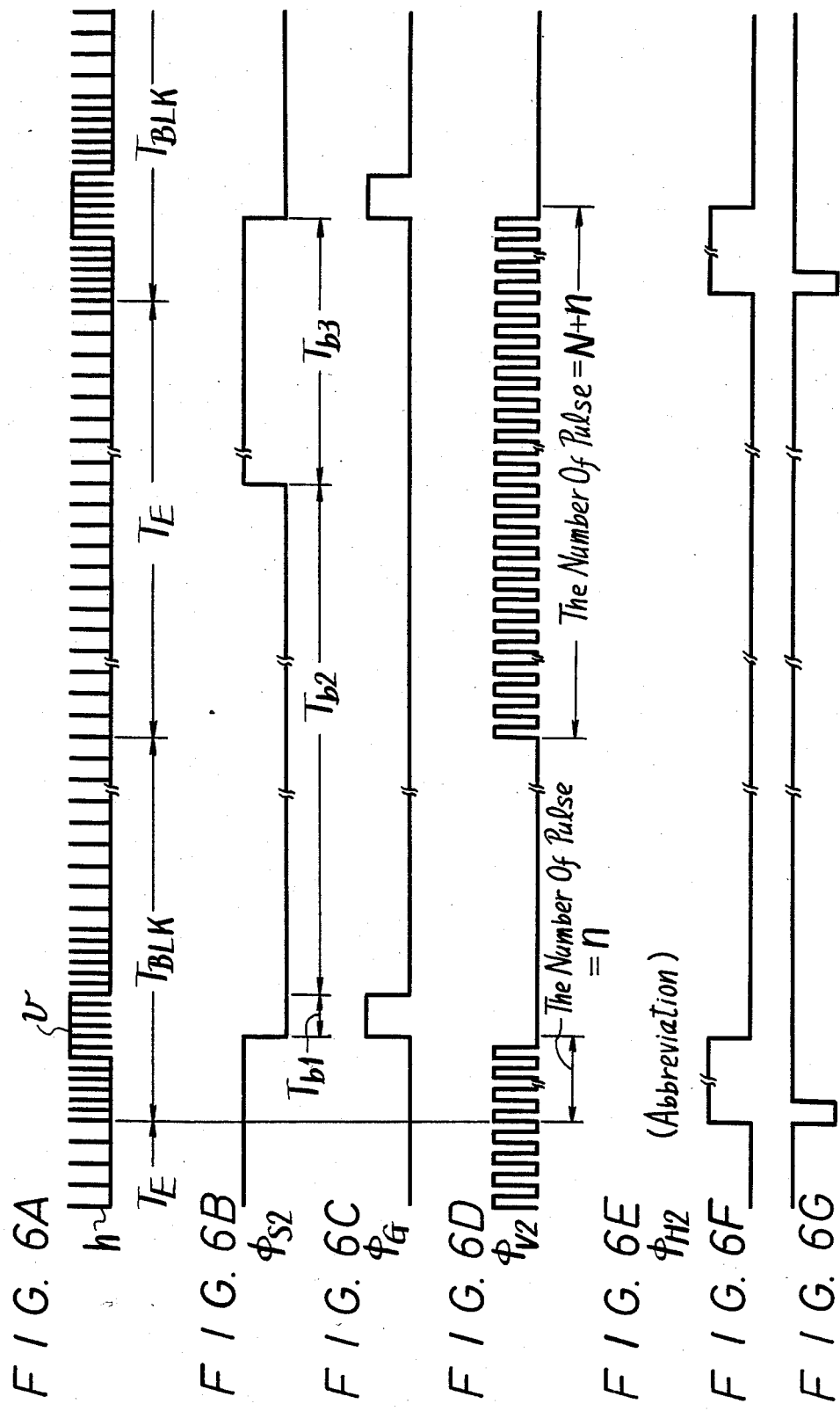
FIGS. 6A through 6G are waveform diagrams each being used to explain the operation of the embodiment shown in FIG. 5.

FIGS. 6A and 6B illustrate the synchronizing signals and the clock signal $\phi_{s2}$ generated from the generator 12 which are same as those of FIGS. 4A and 4B. Further, as seen in FIG. 6C, the gate pulse $\phi_G$ to be supplied to the gate portion 5 is formed after the horizontal period of a predetermined number n counted from the beginning of the vertical blanking period $T_{BLK}$. Moreover, the number of the pulses constituting the clock signal $\phi_{v2}$ to be supplied to the vertical transfer register section 4 is increased by a number n more than the number N of the horizontal lines as shown in FIG. 6D. In addition, the horizontal transfer register section 3 is supplied from the generator 12 with the same clock signal $\phi_{H2}$ as that of FIG. 4E during the period including the horizontal lines of the number n mentioned above as shown in FIG. 6E.

Accordingly, in this imager, after the signals of the N horizontal lines of the image sensing array 1 are derived, the signals of n horizontal lines are derived therefrom. Because the signals of n horizontal lines have no corresponding image sensing units 1a, these signals of n horizontal lines do not have the inherent accumulation signal components due to the picked-up image light and hence they are only the undesirable signal components mixed to the signal in the vertical transfer of the charge.

Therefore, turning back to FIG. 5, let us proceed to the description of the operation of the image further. In the figure, the signal derived from the horizontal transfer register section 3 is supplied through a pre-amplifier 21, an operational amplifier 22 and a processing circuit 23 to an adder 24, in which the synchronizing signals from the synchronizing signal generator 11 are added thereto and taken out at an output terminal 25, while the signal derived from the pre-amplifier 21 is supplied to a detecting circuit 26 to detect the undesirable signal.

In this detecting circuit 26, the signal derived from the pre-amplifier 21 is supplied through a gate circuit 31 to an A/D (analog-to-digital) converter 32 whose output signal is supplied through an adder 33 to a shift register 34. This shift register 34 is of such a capacity corresponding to the amount of {(output bit number of A/D converter 32)+bit number (unit number when n is converted to a binary number)}×(the number of the picture elements of one horizontal line), whereby in the output of the adder 33 is received, shifted and produced at the output of the shift register 34 by one picture element with the clock signal $\phi_{H2}$ applied thereto from the clock generator 12. The output signal of this shift register 34 is supplied to the adder 33 by way of a gate circuit 35. The signal of the shift register 34 is further supplied through a calculating circuit 36 of 1/n to a D/A (digital-to-analog) converter 37 whose output signal is supplied to the inverting input terminal of the operational amplifier 22.

In this detecting circuit 26, the gate circuit 31 is supplied from the clock generator 12 with a gate pulse corresponding to the period within which the aforesaid n horizontal lines are produced as shown in FIG. 6F, so that the gate circuit 31 conducts or is turned on during such period. Also, the gate circuit 35 is supplied from the clock generator 12 with the negative gate pulse corresponding to the first one horizontal period of the above n horizontal lines, so that the gate circuit 35 is cut off during such period.

Accordingly, in this detecting circuit 26, during first one horizontal period of n horizontal lines, the signal of the first horizontal line comprised of only the undesirable signal is A/D-converted and then supplied to the shift register 34, and in the following one horizontal period, the signal read out from the shift register 34 is added to the signal of the next horizontal line and then supplied to the shift register 34. Since this process is performed over the n horizontal lines, the shift register 34 is supplied with the signal, which is provided by totalizing the undesirable signals of n horizontal lines and the signal at every picture element in the horizontal direction. Thereafter, the sum signal is supplied to this shift register 34 over and over. The signal from this shift register 34 is supplied to and calculated as 1/n at the 1/n calculating circuit 36. The signal of 1/n is D/A-converted and then fed to the operational amplifier 22 so as to be subtracted from the original signal.

That is, the shift register 34 produces the sum of the undesirable signals of n horizontal lines, which is then divided into the 1/n so as to eliminate the mean value of the undesirable signals of the n horizontal lines from the original signal.

The value of n is selected to be smaller than the number of the horizontal periods included in the vertical blanking period $T_{BLK}$.

Should the value of the n be selected as $2^x$, the calculation of the 1/n will be possible by shifting the output signal by x bits to the lower bit. Moreover, the value of n may be 1. But, if the mean value is employed as described above the, influences of external disturbances can be removed.

As stated above, the undesirable signal mixed with the signal during the vertical transfer of the charge can be eliminated. According to the present invention, since the vertical transfer of the charge is carried out many more times than the number of the horizontal lines at the image sensing array 1 and the undesirable signal or smear is detected by the signal obtained by the above extra transfer of the charge, without providing the masking portions and so on in the image sensing array 1, satisfactory detection and elimination of the undesirable signal are possible.

Further, FIG. 7 shows a case where the present invention is applied to a frame-transfer type imager. In the figure, storage elements 2a corresponding to the n horizontal lines are additionally provided to the storage section 2 in the body of the CCD 10.

This frame-transfer type imager of FIG. 7 is operated as follows.

FIG. 8A shows the same synchronizing signals as those of FIG. 2A. The clock signal $\phi_{s1}$ supplied from the generator 12 to the image sensing array 1 has the number of pulses of N+n during the period $T_{a1}$ as shown in FIG. 8B. Also, the clock signal $\phi_{M1}$ supplied from the generator 12 to the storage section 2 has the number of pulses of N+n as shown in FIG. 8C. In addition, the horizontal transfer register section 3 is supplied from the generator 12 with the clock signal $\phi_{H1}$ which is the same as shown in FIG. 2D, as illustrated in FIG. 8D.

Accordingly, in this imager of FIG. 7, after the signal of the N horizontal line numbers at the image sensing array 1 is derived, the signal of n horizontal lines is produced and used to thereby enable the undesirable signal or smear to be eliminated. In this case, the detecting circuit 26 for detecting the undesirable signal is constructed equivalently to that shown in FIG. 5. Also, the gate circuits 31 and 35 are supplied from the generator 12 with gate pulses as shown in FIGS. 8E and 8F.

As described above, according to this invention, with a simple construction, it is possible to eliminate the undesirable signal.

The above description is given on the preferred embodiments of the invention, but it will be apparent that many modifications and variations could be effected by one skilled in the art without departing from the spirits or scope of the novel concepts of the invention, so that the scope of the invention should be determined by the appended claims only.

I claim as my invention:

1. A solid state television camera having a solid state image sensing device which reduces extraneous charges including a plurality of individual light sensing units arranged in both horizontal and vertical rows and for sequentially generating a signal corresponding to an image by transferring a charge generated by said light sensing units and said device does not contain any horizontal rows of shielded photodetection regions, said solid state television camera comprising:
   (A) a synchronizing signal generator for generating horizontal and vertical synchronizing signals;
   (B) a clock pulse generator for generating clock pulses corresponding to said horizontal synchronizing signal and controlling the sequential transfer of the charge representing one horizontal line of the image, the number of said clock pulses being equal to the sum of the number of said horizontal rows and a predetermined number "n";
   (C) detecting means for detecting the output signal of the image sensing device during a period equal to the number of said clock pulses, and said period occurring after the signal corresponding to said image is obtained and during a part of a vertical blanking period;
   (D) a compensating signal generator supplied with the output of said detecting means for generating a compensating signal; and
   (E) a compensating circuit for reducing the undesirable signal caused by said extraneous charges which mix with the charge representing the image during the transfer of the latter charge by using said compensating signal.

2. A solid state television camera according to claim 1, wherein said solid state image sensing device is a frame-transfer type, and includes a light receiving area having said plurality of individual light sensing units arranged in both horizontal and vertical rows, a storage area having a plurality of storage devices arranged in both horizontal and vertical rows, the number of the vertical rows being the same as that of the vertical rows of said light sensing units and the number "n" of the horizontal rows being greater than that of the horizontal rows of said light sensing units by said predetermined number, and a shift register for generating the sequential signal corresponding to the image.

3. A solid state television camera according to claim 1, wherein said solid state image sensing device is an inter-line transfer type and includes said plurality of individual light sensing units, gating means connected to each of said light sensing units, charge transferring means connected to each of said gating means and a shift register for generating the sequential signal corresponding to the image.

4. A solid-state television camera according to claim 1, wherein said detecting means includes a gate circuit turned on during said period, and said compensating signal generator includes a memory for memorizing the output of said gate circuit.

5. A solid state television camera according to claim 4, wherein said detecting means further includes an analog-to-digital converter for converting the output of said detecting means to a digital signal, said memory is a shift register the output of which is added to the output of said analog-to-digital converter and the added signal is supplied to the input of said shift register, an averaging circuit for averaging the output of said shift register and a digital-to-analog converter for converting the output of said averaging circuit to an analog signal which forms a compensating signal.

6. A solid state television camera according to claim 5, wherein said compensating circuit includes a differential amplifier for subtracting the output of said digital-to-analog converter from the output of said solid state image sensing device.

* * * * *